United States Patent Office 3,472,518
Patented Oct. 14, 1969

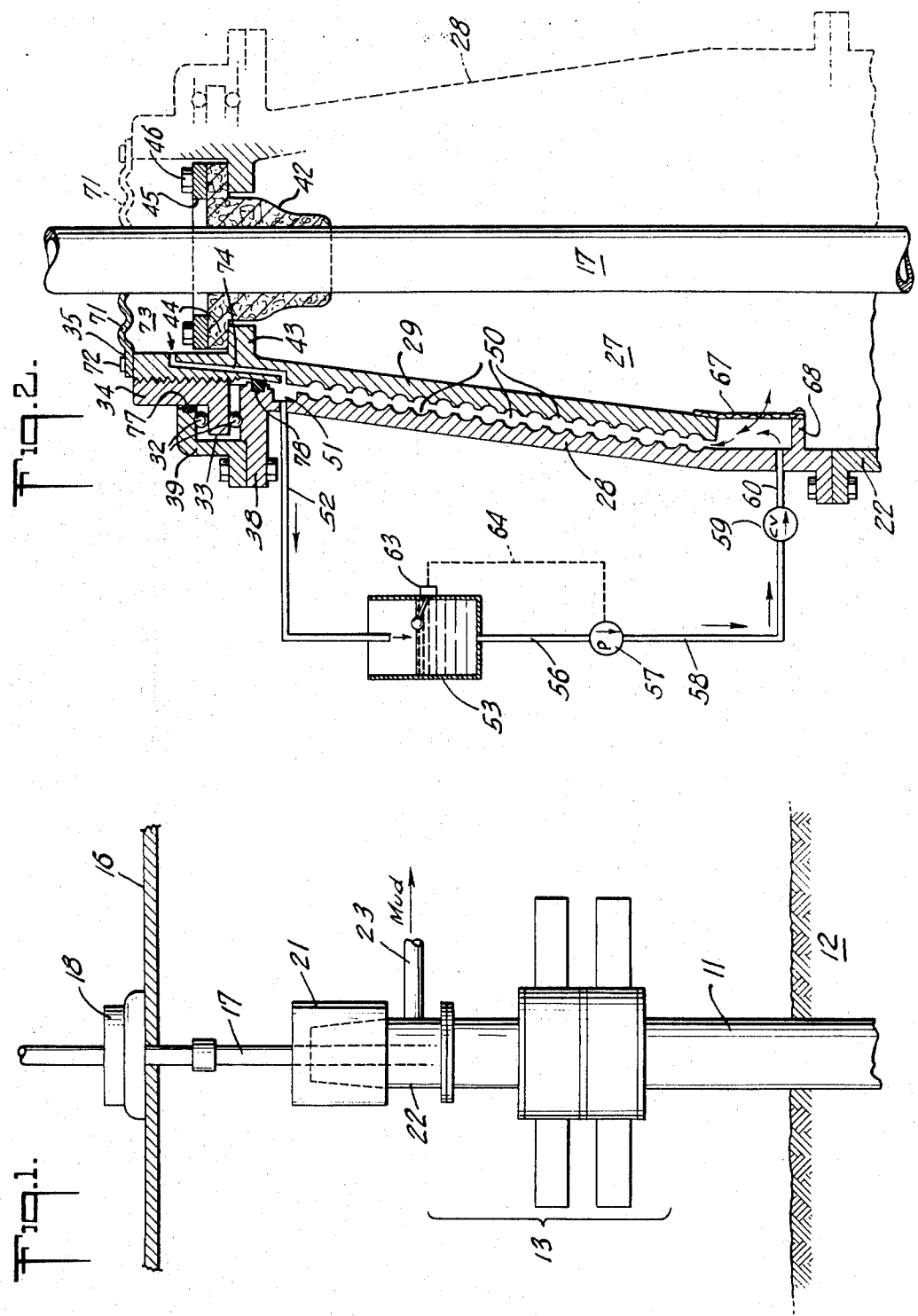

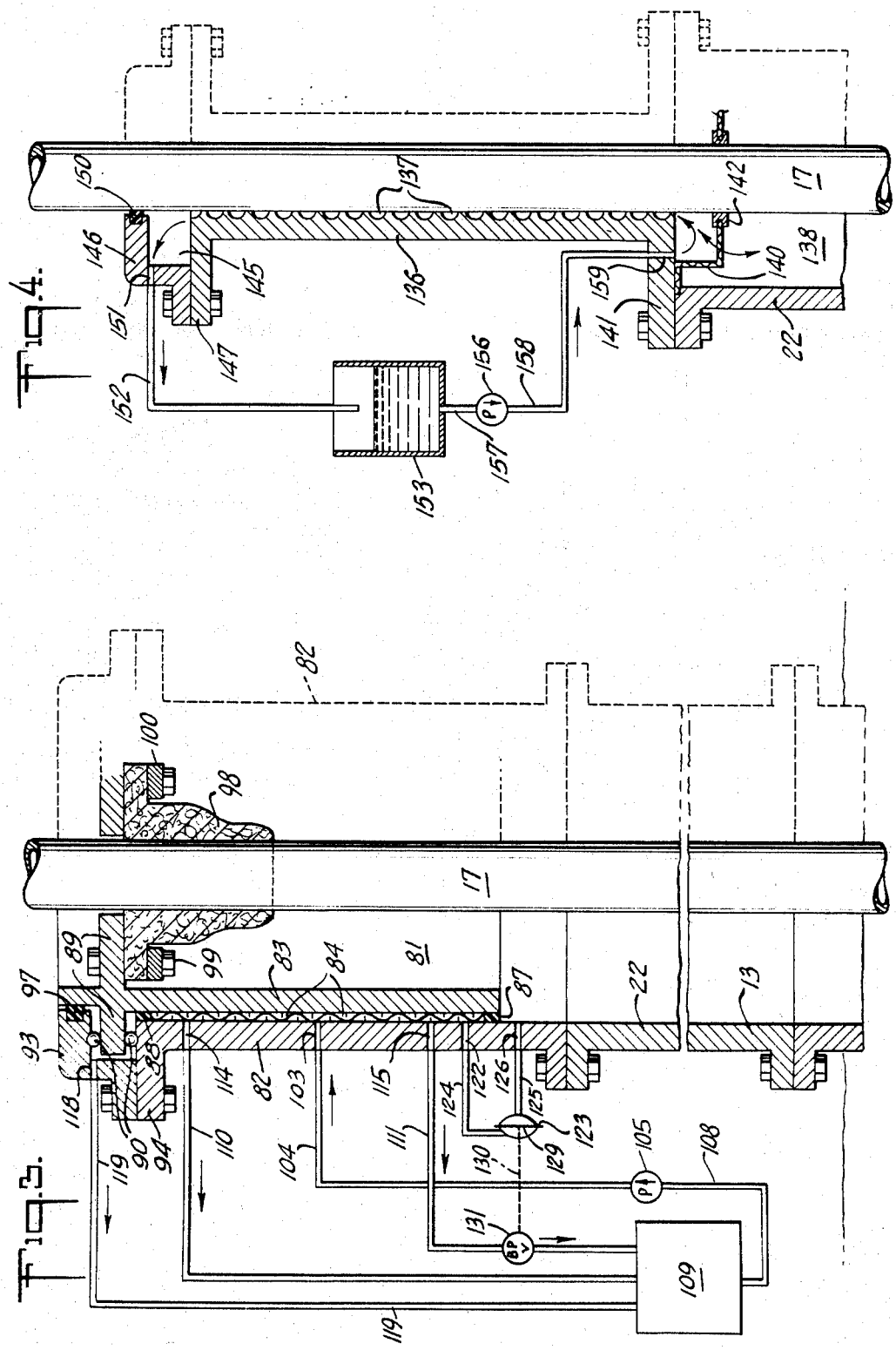

3,472,518
DYNAMIC SEAL FOR DRILL PIPE ANNULUS
Don L. Harlan, Houston, Tex., assignor to Texaco Inc.,
New York, N.Y., a corporation of Delaware
Filed Oct. 24, 1966, Ser. No. 589,111
Int. Cl. F16j 15/16; E21b 33/00; F16k 41/00
U.S. Cl. 277—31          8 Claims

ABSTRACT OF THE DISCLOSURE

A dynamic drill pipe seal has a resilient sleeve in pressure tight contact with the rotatable pipe. This sleeve may slide longitudinally along the pipe and is supported by a spool so both may rotate freely together at all times. There is a housing for the spool with an internal connection to the annulus of the well that surrounds the pipe. A pressure sealing fluid flows between the housing and the spool to provide a floating low friction seal.

---

This invention concerns a dynamic type of seal apparatus for use with a rotating element in order to obtain a pressure tight seal with respect to an annulus around the rotating element. More specifically, the inveniton relates to a dynamic type seal for use with oil well rotary drilling apparatus and particularly with respect to maintaining a pressure seal on the annulus around drill pipe while drilling is in progress.

Heretofore it has been frequently found to be necessary during the drilling of boreholes in the earth, to maintain a fluid pressure on the formations that are penetrated by the drill. This is in order to prevent flow of liquids or gases out of the formation into the borehole during the drilling operations. While one approach to this problem in the past has been the use of high density drilling mud in order to provide sufficient hydrostatic pressure on the formation, the use of such procedure results in a lower penetration rate because of the higher viscosity and in addition, it may cause other undesirable effects. Furthermore, while one type of equipment has been provided that will maintain a pressure seal around drill pipe at the upper end of an annulus, such equipment has the drawback of being quite complex and expensive. In addition, the last named type of equipment requires rather frequent lubrication by way of adding grease thereto as well as requiring occasional repacking. The repacking necessitates a rig shutdown, which is costly.

Consequently, it is an object of this invention to provide apparatus which overcomes the drawbacks of the prior art, and which can provide for relatively simple apparatus that is long lasting and effective.

Briefly, the invention may be described as a dynamic seal for drill pipe annulus, which comprises in combination a stationary member surrounding said drill pipe and connected to said annulus. In addition, the seal comprises a rotary member turning with said drill pipe, and means for providing a tortuous fluid flow path between said stationary and said rotary members whereby pressure drop between said annulus and the outside of said stationary member is absorbed across said tortuous path.

Again briefly, the invention concerns a dynamic seal for drill pipe annulus which comprises in combination a resilient seal means contacting said pipe for rotation therewith, and a spool means for supporting said resilient seal means. It also comprises anti-friction bearing mean for rotatably supporting said spool means, and a housing for supporting said bearing means. Additionally, it comprises pump means for circulating oil between said spool and said housing in order to seal said annulus from the exterior of said housing and a means for circulating said oil over a substantial portion of the total path between said spool and said housing. Furthermore, there is included as part of said means for circuating the oil, a means for connecting one side of said pump means to an intermediate point between the ends of said total path, and a means for connecting the other side of said pump means to points adjacent to the ends of said total path.

In addition, the dynamic seal comprises means for sensing a pressure differential between said annulus and said path, which includes a pressure differential sensitive element having two sides, a means for connecting one side of said last named element to said annulus, and a means for connecting the other side of said last named element to said total path adjacent to the end thereof that connects with said annulus. Also, in addition, the dynamic seal comprises means activated by said sensing means for controlling the pressure applied to said oil in said path so as to counteract the pressure in said annulus, which includes a back pressure control valve located in one of said "means for connecting the other side of said pump" to the points adjacent the ends of the total path, and a means for activating said back pressure valve in accordance with the pressure differential as sensed by said sensitive element. Furthermore and finally, the dynamic seal comprises means for connecting said anti-friction bearing means with the return for said pump in order ot recirculate leakage oil that has passed the end of said total path adjacent to said bearing means.

The foregoing and other objects and benefits of the invention will be more fully set forth below in connection with the best mode or modes contemplated by the inventor of carrying out the invention, and in connection with which there are illustrations provided in the drawings, wherein:

FIG. 1 is a schematic elevational view illustrating the surface elements of a rotary drilling oil well rig, and showing a preferred location for a dynamic seal according to this invention, in connection therewith;

FIG. 2 is a longitudinal cross-section illustrating schematically one embodiment of a seal according to the invention;

FIG. 3 is another longitudinal cross-section illustrating a preferred embodiment of a differential form of the invention; and FIG. 4 is a third longitudinal cross-section illustrating yet another embodiment according to the invention.

FIG. 1 illustrates schematically the elements involved in a rotary type drilling oil well and the general location, with respect thereto, of apparatus in accordance with this invention. Thus, where a well is being drilled and it is expected or has been found that formations are encountered which tend to release fluids under considerable pressure, some means is required to control such pressure in order to avoid blowouts which may be extremely dangerous and/or destructive.

Such a blowout tends to occur because of a rise in pressure in the annulus of the well. This annulus surrounds the drill pipe which is acting to support a bit and carry drilling mud therein for cooling the bit and carrying away the cuttings in a well-known manner. The top of such annulus is, of course, within the surface casing of the well; and such surface casing will have been set and cemented in place. Therefore, in order to contain any such pressure rise, a seal is necessary with respect to the interior of the casing and the exterior of the drill pipe which is what is being referred to herein as the "drill pipe annulus."

The above indicated elements will be situated as shown by the schematic illustration of FIG. 1. There is a surface casing 11 extending above the surface of the earth 12. The casing 11 has securely attached thereto a series of blowout preventers 13 in the usual manner. Also, extending down into the casing 11 through the blowout preventers 13 from a rig floor 16, there is a string of drill pipe 17 that has a bit (not shown) attached at the lower end thereof and that is driven in rotation by a rotary 18 located on the rig floor 16 in a well-known manner.

In order to contain or counteract pressure increases in the annulus of the well while drilling, i.e., within casing 11 and surrounding drill string 17; there may be employed a dynamic seal 21 in accordance with this invention. It will be located, as indicated in FIG. 1, by being attached to a mud riser section 22 attached at the top of the blowout preventers 13. It will be observed that there is a conduit 23 connected to the mud riser 22 in order to make a path for circulating the drilling fluid, commonly called drilling mud, from the annulus within casing 11 and through blowout preventers 13 to a mud pit (not shown). Such fluid is, of course, circulated from the mud pit by means of a mud pump (not shown) downward within the drill pipe 17 in order to provide the fluid for the drilling process as generally indicated above.

It will be observed that in order to maintain a dynamic fluid type seal between the drill pipe 17 and the annulus (within surface casing 11 etc.) there will tend to be much wear and friction to contend with by reason of the continuous rotation of the drill pipe. On the other hand, the vertical translation movement of the drill pipe will be relatively small and slow so that the problem of wear is not great and a resilient sleeve could be used satisfactorily so long as it is allowed to rotate with the pipe and thus only slide vertically in relation thereto.

Now while one approach to this problem, as already indicated above, has involved the use of a dual aspect seal structure; such approach has entailed the drawbacks of a complex structure with the requirement for adding lubricant at frequent intervals and periodically repacking it which latter necessitates a shutdown of the rig. On the other hand, the structure according to this invention provides for maintaining a fluid type seal under pressure to permit the rotation in a low friction wear free manner, without complex structure, by having a fluid path maintained between stationary structure surrounding the drill pipe and a rotating member. The rotating member may be either the drill pipe itself or a spool that rotates with the drill pipe and is sealed thereon by a sleeve-type structure.

One embodiment of apparatus for a dynamic seal according to the invention, is illustrated in FIG. 2. There is a housing 28 attached to the upper end of the mud riser 22 in a pressure-tight manner. Within the annulus, i.e., an interior space 27 that surrounds the drill pipe 17, there is a spool 29 that rotates with the drill pipe 17 at all times. The spool 29 is supported for such rotation in an anti-friction manner by simple ball bearing elements which include a plurality of balls 32 that contact the upper and lower surfaces of a flange 33 which is attached to the upper end of the spool 29 in any feasible manner. For example, there is illustrated a collar or ring 34 that is screwed onto a threaded section 35 at the upper end of the spool 29. This permits adjustment to compensate for wear or the like. There will, of course, be supporting structure for the ball bearing arrangement, such as a horizontal flange 38 at the top of housing 28, and to which is bolted an S-ring 39 that will hold the retainer (not shown) for the upper row of balls 32 of the bearing structure.

Integrally attached to the inside of the spool 29 there is a resilient sleeve 42 that is carried by a ring 43 that extends inward from the spool 29 and is integral therewith. The sleeve 42 has an integrally molded flange 44 that extends radially in an overlapping manner with respect to the ring 43. This flange 44 is clamped between the ring 43 of spool 29 and a clamping ring 45 by means of a plurality of bolts 46, as illustrated.

It will be observed that this arrangement provides for a free rotation of the spool 29 and the sleeve 42 therewith. Consequently, there will be no relative motion or slippage, in a rotational sense, between the drill pipe 17 and the sleeve 42 and the sleeve will maintain a fluid tight seal therearound. Of course, any vertical translation movement of the drill pipe 17 will cause relative sliding movement between the drill pipe and the sleeve 42, but such movement is relatively slow and small so that the wear caused thereby will be minimal.

In order to provide the desired fluid tight seal (even under pressure) between the annulus or space 27 around drill pipe 17, and the exterior of the housing 28, there is a tortuous path 50 that is provided between the outer surface of the spool 29 and the inner surface, adjacent thereto, of the housing 28. The pressure within the annulus 27 will thus be contained by the fluid, e.g., drilling mud that is within the annulus and that tends to flow through the path 50 because of the pressure. By having the structure of path 50 tortuous in nature, there will be a substantially complete dissipation of the pressure therealong.

In other words, the drop from high pressure within the annulus 27 to atmospheric pressure on the outside of the housing 28 will be distributed evenly throughout the tortuous path 50. However, some of the fluid will flow along the path 50 and reach an annular chamber 51 located at the upper end of the path 50 (when viewed as illustrated in FIG. 2). This fluid is returned to the annulus 27 once more via a pipe or conduit 52. Conduit 52 leads to a tank 53 from which the fluid is returned to the annulus 27 by means of a conduit 56 leading to a pump 57. From pump 57 the fluid flows via another conduit 58 to a check valve 59 from which the fluid returns to the annulus 27 via another conduit 60.

It will be observed that the return of the fluid from the tank 53 to the annulus 27 is controlled by periodic actuation of the pump 57 when the level of the fluid in tank 53 reaches a predetermined height, as determined by a float control 63. There will be, of course, any feasible arrangement of the necessary structure for controlling pump 57. Such structure is indicated by a dashed line 64.

In order to avoid the clogging of path 50 by solids contained in the drilling fluid, there is a screen 67 attached to the inside of the housing 28 in any feasible manner such as by a ring 68 to which the screen 67 is attached in an overlapping manner with respect to the lower edge on the inside of the spool 29.

At the top of spool 29 there is a flexible disc 71 that is attached at its outer edges to the top edge of the body of spool 29 by a series of short machine screws 72 or the like. The inner edge of the disc 71 bears against the drill pipe 17 and forms an annular space 73 inside the top of spool 29. Thus, any leakage of fluid past the sleeve 42 will accumulate in space 73. After it reaches a given level, such accumulated fluid will return to join the circulation of fluid through the path 50 by flowing through an internal passage 74 (in the body of spool 29) that connects the annular space 73 with the annular chamber 51.

It may be noted, as indicated above, that by having the ring 34 attached to the top of the spool 29 by threads 35, there is provided an adjustment to compensate for wear. This will be accomplished by turning the ring 34 relative to the spool 29, as desired. Also, it may be noted that there are a pair of seal rings 77 and 78 located above and below, respectively, the ball bearing elements including the balls 32 and the flange 33.

FIG. 3 illustrates a preferred embodiment of the structure for a seal 21 (FIG. 1) according to the invention. This is similar to FIG. 2 in many ways, but it employs a separate fluid, e.g., oil as the fluid flowing through the tortuous path that separates the spool from the housing.

Thus, like the FIG. 2 embodiment, the seal 21 of the FIG. 3 embodiment is attached above the mud riser 22 and the blowout preventer stack 13 that surrounds the drill pipe 17. However, in this embodiment there is a cylindrical housing 82 that is bolted onto the top of the mud riser 22 in order to maintain a pressure tight seal with an annulus 81 surrounding the drill pipe 17 on the inside of the housing 82. Of course, this annulus 81 connects with the total drill pipe annulus down into the well, through the surface casing 11.

There is a spool 83 that is situated concentrically within the body or housing 82 and is spaced therefrom to form a tortuous path 84. In this preferred embodiment the tortuous path 84 may take any feasible form, but is preferably a labyrinth seal structure which is adapted for allowing a flow of a lubricant, e.g., an appropriate weight lubricating oil therethrough. The path 84 has closed ends by reason of a pair of seal rings 87 and 88 that are fastened to the housing 82 and bear lightly against the surface of the spool 83. In this manner, the lubricating oil in the tortuous path 84 is confined therein.

Near the top of the spool 83 there is a transverse or radial flange 89 that extends on the outside of the spool to form one of the supports for ball bearings 90 that withstand longitudinal thrust on the spool but permit free rotational movement thereof. The housing 82 supports the lower set of the ball bearings 90, as indicated, and the upper set is supported by an S-ring 93 that is bolted onto a flange 94 that in turn extends radially outward from the top edge of the housing 82.

It may be noted that there is another seal ring 97 that is supported on the inner circumference of the S-ring 93 and bears against the outer edge of the upper extension of the spool 83. This seal will retain any oil that tends to seep out about the ball bearings 90.

Inside the spool 83, the structure is basically similar to that described in connection with the FIG. 2 embodiment. Thus, there is a resilient sleeve 98 that is in relatively tight contact with the drill pipe 17. It is supported by and attached securely to the spool 83, by means of a series of bolts 99 and a clamping ring 100 that fastens the sleeve 98 to the inner extension of the flange 89 that is integral with the spool 83.

In this embodiment, the oil flowing through path 84 is circulated in a divided manner. It is introduced at a point about midway along the extent of the tortuous path 84, through a port 103 that extends through the housing 82. It is delivered to the port 103 via a conduit 104 connected thereto. Pressure for circulating this oil through the conduit 104, is created by a pump 105 that has the intake side thereof connected via a conduit 108 to a reservoir 109.

Since the oil is introduced at the mid-point along the path 84 it will divide and flow both upward and downward along the path, and return to the reservoir 109 via a pair of conduits 110 and 111 that are connected to ports 114 and 115, respectively. These latter ports, like port 103, extend through the housing 82 and provide connections to the annular tortuous path 84.

It will be observed that there may be provided a leakage return path for oil to flow from the annular spaces where the ball bearings 90 are located. This path is via a port 118 through the S-ring 93 and then through a conduit 119 that extends back to the reservoir 109.

There is provided a means for preventing any of the oil in path 84 from entering the annulus 81 around the drill pipe 17, while at the same time maintaining sufficient pressure on the oil to prevent leakage of the drilling fluid (under pressure) within the annulus 81 into the oil stream. This is accomplished by maintaining the pressure on the oil stream in path 84 at the end adjacent to the annulus 81, at substantially the same amplitude as the pressure within the annulus 81 around drill pipe 17. In order to do that, there is a port 122 through the housing 82. It is located near the lower end of the path 84 but above the seal ring 87. This port 122 is connected to one side of a pressure differential sensing element 123 via a conduit 124. The other side of the pressure differential element 123 is connected via another conduit 125 to a port 126 that extends through the housing 82 but is located below the lower edge of the spool 83 and so connects directly into the annulus 81 around drill pipe 17.

The pressure differential sensing element 123 is only schematically indicated and, of course, might take various different forms. For example, it may have a flexible diaphragm 129 that has an arrangement (that is indicated by a dashed line 130) for providing control of a back pressure valve 131. It will be noted that the back pressure valve 131 is connected into the conduit 111 so as to control that portion of the return flow of oil through the lower half of the divided flow through the path 84, on the way back to the reservoir 109.

It will be observed that this arrangement provides for controlling the return flow of oil at a point near the end of one-half of the divided flow path through tortuous path 84. This flow control is determined by the pressure differential between the oil near the end of path 84 (that is adjacent to the seal ring 87) and the fluid in the annulus 81 around drill pipe 17. In this manner if the oil pressure should exceed the pressure in the annulus 81 there will be a tendency for seepage of oil into the annulus, but the differential of pressures will cause actuation of the element 123, e.g., by flexing the diaphragm 129 and thus controlling the back pressure valve 131. This is arranged in such a way as to open the valve 131 some more and allow greater flow of the oil through return line 111 so as to reduce the pressure of the oil. Similarly, if the pressure in the annulus 81 is higher than the pressure of the oil in path 84 (as determined by the connection through the conduit 124 and port 122 with one side of the pressure differential element 123), then the diaphragm 129 will be flexed the other way and the back pressure valve 131 will be closed further. This will cause an increase in pressure of the oil in path 84 so as to equalize with respect to the pressure in the annulus 81 around drill pipe 17.

It will be observed that this embodiment of the invention provides for a relatively simple structure that is extremely effective in providing a wear-free pressure seal for allowing continuous rotation of the drill pipe while holding the pressure in the annulus equalized.

FIG. 4 illustrates another embodiment of the invention. It being one wherein the spool structure is eliminated, and the drill pipe 17 itself acts as the rotary member. Thus, attached to the top of the mud riser 22 and surrounding the drill pipe 17 there is a stationary member or housing 136. In this instance, the body of the housing 136 extends close to the surface of the drill pipe 17. It has on the inner surface thereof a series of rings or grooves forming a tortuous path 137 between the outer surface of the drill pipe 17 and the inner surface of the housing 136. This path 137 acts similarly as the tortuous paths 50 and 84 of the other embodiments, and thus provides for a fluid flow that absorbs the pressure drop from the pressure in annulus 138 around drill pipe 17, to atmospheric pressure on the exterior of the housing 136. Consequently, as before, the pressure in annulus 138 is contained while a low-friction arrangement is provided for permitting free rotation of the drill pipe 17, without undue wear or other difficulties of the prior art.

In this embodiment, similarly as in the FIG. 2 embodiment, the fluid flowing through path 137 is the drilling mud and solids are excluded by an annular screen 140 that is attached at the outer edge thereof to the lower surface of a flange 141 on the housing 136. The inner edge of the screen 140 has a wiper ring 142 attached thereto. It rests against the surface of the drill pipe 17. Thus, the solids carried by the drilling fluid in the annulus 138 will be screened out and kept from flowing in the tortuous path 137.

Fluid from the upper end of the path 137 will accumulate in an annular chamber 145 that is formed within an S-ring 146 which is bolted to the top of the housing 136 by means of a flange 147 thereon. The inner edge of the S-ring 146 extends close to the surface of the drill pipe 17 and supports a seal ring 150 for preventing leakage of the fluid from the chamber 145. Fluid that has accumulated in chamber 145 is returned for recirculation via a port 151 through the S-ring 146 and a conduit 152 that leads back to a tank 153. From the tank 153 the fluid is pumped by a pump 156 via connecting conduits 157 and 158 which lead to a port 159 that connects the exterior of the housing 136 with the annular space 138 but inside of the screen 140. It will be observed that this arrangement provides for an effective dynamic seal to safely contain high pressures on the annulus 138 surrounding the drill pipe 17 while permitting low-friction free rotation of the drill pipe during drilling operations.

It may be noted that among the advantages to be gained by employing structure according to this invention are those coincident to the use of relatively low density drilling mud.

It will be appreciated that the structure of the tortuous paths employed may take various forms and this element per se does not constitute the invention.

While particular embodiments of the invention have been described above in considerable detail in accordance with the applicable statutes, this is not to be taken as in any way limiting the invention but merely as being descriptive thereof.

I claim:

1. A dynamic seal for a drill pipe, comprising in combination,
    resilient means for contacting said pipe in sealing relation therewith and adapted for rotation therewith,
    spool means for supporting said resilient means,
    anti-friction bearing means for rotatably supporting said spool means,
    a housing for supporting said bearing means, said spool means positioned radially between said pipe and said housing providing an annulus between said pipe and said spool means and a labyrinth seal between said spool means, and
    pump means for circulating a fluid between said spool and said housing for sealing said annulus from the exterior of said housing.

2. A dynamic seal according to claim 1, wherein said circulating fluid is oil.

3. A dynamic seal according to claim 1, wherein said circulating fluid is drilling fluid.

4. A dynamic seal according to claim 2, further comprising,
    means for circulating said oil over a substantial portion of the total path between said spool and said housing.

5. A dynamic seal according to claim 4, wherein said means for circulating said oil comprises,
    means for connecting one side of said pump means to an intermediate point between the ends of said total path, and
    means for connecting the other side of said pump means to points adjacent to the ends of said total path.

6. A dynamic seal according to claim 5, further comprising,
    means for sensing a pressure differential between said annulus and said path, and
    means activated by said sensing means for controlling the pressure applied to said oil in said path so as to counteract the pressure in said annulus.

7. A dynamic seal according to claim 6, wherein said sensing means comprises,
    a pressure-differential sensitive element having two sides,
    means for connecting one side of said last named element to said annulus, and
    means for connecting the other side of said pressure-differential sensitive element to said total path adjacent to the end thereof that connects with said annulus,
    and wherein said activated means comprises,
        a back pressure control valve located in one of said means for connecting the other side of said pump to the points adjacent the ends of the total path, and
        means for activating said back pressure valve in accordance with the pressure differential as sensed by said sensitive element.

8. A dynamic seal according to claim 7, further comprising,
    means for connecting said anti-friction bearing means with the return for said pump in order to recirculate leakage oil that has passed the end of said total path adjacent to said bearing means.

References Cited

UNITED STATES PATENTS

| | | | |
|---|---|---|---|
| 2,303,090 | 11/1942 | Pranger et al. | 277—31 |
| 2,721,747 | 10/1955 | Whitfield | 277—15 X |
| 2,786,652 | 3/1957 | Wells | 175—25 |
| 2,883,214 | 4/1959 | Perlaki | 277—3 |
| 3,023,012 | 2/1962 | Wilde | 277—31 |
| 3,052,300 | 9/1962 | Hampton | 277—31 X |
| 3,246,901 | 4/1966 | Wickli | 277—3 |
| 3,268,233 | 8/1966 | Brown | 277—31 |

FOREIGN PATENTS 198,310   9/1965   Sweden.

SAMUEL ROTHBERG, Primary Examiner

U.S. Cl. X.R.

277—53, 59